(No Model.)
H. REICHE.
PERFORMING PLATFORM FOR ANIMALS.
No. 461,449. Patented Oct. 20, 1891.
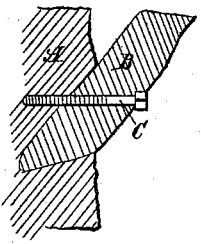
WITNESSES:
William Goebel.
Reuben S. Lind.
INVENTOR
Hermann Reiche
Adam E. Schatz
ATTORNEY.

UNITED STATES PATENT OFFICE.

HERMANN REICHE, OF NEW YORK, N. Y.

PERFORMING-PLATFORM FOR ANIMALS.

SPECIFICATION forming part of Letters Patent No. 461,449, dated October 20, 1891.

Application filed March 13, 1891. Serial No. 384,879. (No model.)

*To all whom it may concern:*

Be it known that I, HERMANN REICHE, a citizen of the United States, and a resident of New York, in the county of New York and State of New York, have invented a certain new and useful Improved Performing-Platform for Animals, of which the following is a specification.

My invention relates to a platform designed for use for trick or performing animals, and is made in the shape of a tree, having artificial limbs set into the side thereof in a spiral line from the bottom to the top, which form stairs or steps, thus enabling heavy quadrupeds to walk up and mount the top of the platform, as shown by the elephant in the drawings, or, in other words, "to enable an elephant to climb up a tree."

In the drawings, Figure 1 represents the trunk of a tree, having a number of limbs run around it from the bottom to the top in a spiral line in such a manner that they form steps from the base to the top of the tree-trunk. Fig. 2 shows how the limbs or steps are fastened into the side of the platform, in which A represents the tree-trunk or platform, B a limb, and C a screw-bolt to fasten the limb. Of course any number of means may be applied to fasten the limbs B.

In practice I have taken the trunk of an oak of a diameter of about two feet, which is suitably fastened to the floor in an upright position. The steps B are fastened into the side around the trunk in a spiral line from the bottom to the top, and may be provided with the flanged disk D, upon which the animal steps and which prevents his foot from slipping off. The limbs are set out far enough to give the body of the animal ample room. The dotted lines B indicate the position of the limbs on the reverse side of the trunk.

As shown in the drawings, an elephant stands or performs on the upper end of the tree. I have educated the elephant "Fanchon" to walk up the side of the tree-trunk, where, when he reaches the top, he turns about and stalks down again. Horses and other animals may be taught to do the same.

The platform may be constructed of any suitable material. It may be made of iron frame-work and covered in imitation of a tree-trunk with limbs, or it may be given the shape of a spiral stairs. When made to imitate a tree-trunk, small limbs may be added to give it a more natural effect.

Having described my invention, what I claim as new, and desire to secure by Letters Patent, is—

1. A performing-platform for animals, made in imitation of the trunk of a tree, having limbs affixed around it in a spiral line from bottom to top to form steps, substantially as described.

2. A performing-platform for animals, constructed in imitation of the trunk of a tree which has limbs affixed around it from bottom to top in a spiral line to form steps, and said steps being provided with a flange-shaped disk, as and for the purpose described.

Signed at New York, in the county of New York and State of New York, this 10th day of March, A. D. 1891.

HERMANN REICHE.

Witnesses:
RICHARD LIPS,
GEORGE FEHRING.